US010810726B2

(12) United States Patent
Kokkula et al.

(10) Patent No.: US 10,810,726 B2
(45) Date of Patent: Oct. 20, 2020

(54) SYSTEMS AND METHODS FOR DETECTING CONTENT IN IMAGES USING NEURAL NETWORK ARCHITECTURES

(71) Applicant: Walmart Apollo, LLC, Bentonville, AR (US)

(72) Inventors: Samrat Kokkula, Santa Clara, CA (US); Shreyansh Prakash Gandhi, Milpitas, CA (US); Abon Chaudhuri, Sunnyvale, CA (US); Theban Stanley, San Bruno, CA (US); Behzad Ahmadi, San Jose, CA (US); Venkatesh Kandaswamy, San Ramon, CA (US); Alessandro Magnani, Menlo Park, CA (US); Omer Ovenc, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 58 days.

(21) Appl. No.: 16/262,589

(22) Filed: Jan. 30, 2019

(65) Prior Publication Data

US 2020/0242750 A1 Jul. 30, 2020

(51) Int. Cl.
*G06T 7/00* (2017.01)
*G06K 9/00* (2006.01)
(Continued)

(52) U.S. Cl.
CPC ........ *G06T 7/0002* (2013.01); *G06K 9/00624* (2013.01); *G06K 9/6256* (2013.01);
(Continued)

(58) Field of Classification Search
CPC .............. G06T 7/0002; G06K 9/00624; G06K 9/6256; G06K 9/6267; G06K 9/00362;
(Continued)

(56) References Cited

U.S. PATENT DOCUMENTS 6,269,351 B1 7/2001 Black
6,904,168 B1 6/2005 Steinberg et al.
(Continued)

FOREIGN PATENT DOCUMENTS

CN 101923652 12/2010
EP 1107130 6/2001
(Continued)

OTHER PUBLICATIONS

Indyk et al., "Approximate Nearest Neighbors: Towards Removing the Curse of Dimensionality," STOC '98: Proceedings of the 30th Annual ACM Symposium on Theory of Computing, May 1998, https://dl.acm.org/doi/proceedings/10.1145/276698, 1998.
(Continued)

*Primary Examiner* — Michael S Osinski
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of: receiving an image at a first-level analysis component comprising a first neural network structure; analyzing, using the first neural network structure of the first-level analysis component, the image to determine an image category associated with the image; selecting at least one second-level analysis component that is associated with the image category to analyze the image; analyzing, using a second neural network structure associated with the at least one second-level analysis component that was selected, the image to determine whether the image includes non-compliant content; and in response to determining that the image includes non-compliant content, executing a corrective measure. Other embodiments are disclosed herein.

20 Claims, 7 Drawing Sheets

(51) Int. Cl.
  *G06K 9/62* (2006.01)
  *G06N 3/04* (2006.01)
(52) U.S. Cl.
  CPC ......... *G06K 9/6267* (2013.01); *G06N 3/0454* (2013.01); *G06T 2207/20084* (2013.01)
(58) Field of Classification Search
  CPC ............. G06K 9/00718; G06K 9/6254; G06K 9/00335; G06K 9/00302; G06K 9/00288; G06N 3/0454; G06N 3/08; G06N 3/084; G06N 3/0472; G06N 3/088; G06N 20/00; H04L 51/12; H04L 51/32; H04L 51/046; H04L 51/063; H04N 21/454; H04N 21/23418; H04N 21/234336; H04N 21/4542
  See application file for complete search history.

(56) References Cited

U.S. PATENT DOCUMENTS

| | | | |
|---|---|---|---|
| 7,403,928 | B2 | 7/2008 | Chen |
| 7,831,530 | B2 | 11/2010 | Hashimoto |
| 8,086,039 | B2 | 12/2011 | Kletter |
| 8,374,974 | B2 | 2/2013 | Chen et al. |
| 8,411,964 | B2* | 4/2013 | Choi ................. G06K 9/00362 382/162 |
| 8,611,617 | B1 | 12/2013 | Baluja et al. |
| 8,644,606 | B2 | 2/2014 | White et al. |
| 9,418,458 | B2 | 8/2016 | Chertok et al. |
| 9,922,272 | B2 | 3/2018 | Cheng et al. |
| 10,225,086 | B2 | 3/2019 | Benchetrit et al. |
| 10,250,538 | B2* | 4/2019 | Prabhu ................ H04L 51/12 |
| 10,346,969 | B1 | 7/2019 | Raghu et al. |
| 10,426,442 | B1* | 10/2019 | Schnorr ............... A61D 19/02 |
| 10,664,722 | B1 | 5/2020 | Sharma et al. |
| 10,679,046 | B1 | 6/2020 | Black et al. |
| 2005/0160258 | A1 | 7/2005 | O'Shea et al. |
| 2008/0134282 | A1* | 6/2008 | Fridman ............ G06Q 10/10 726/1 |
| 2008/0159627 | A1 | 7/2008 | Sengamedu |
| 2011/0135204 | A1* | 6/2011 | Choi ................. G06K 9/00362 382/195 |
| 2011/0142346 | A1* | 6/2011 | Han .................. G06K 9/00221 382/190 |
| 2013/0151609 | A1* | 6/2013 | Rubinstein ............. H04L 51/12 709/204 |
| 2016/0275343 | A1 | 9/2016 | Dinerstein et al. |
| 2016/0294755 | A1* | 10/2016 | Prabhu ................ H04L 51/046 |
| 2017/0061625 | A1 | 3/2017 | Estrada et al. |
| 2017/0177997 | A1 | 6/2017 | Karlinsky et al. |
| 2017/0287137 | A1 | 10/2017 | Lin et al. |
| 2018/0032840 | A1* | 2/2018 | Yu ..................... G06N 3/08 |
| 2018/0129978 | A1* | 5/2018 | Vigoda ................. G06N 5/046 |
| 2018/0137390 | A1 | 5/2018 | Brundage et al. |
| 2018/0152402 | A1* | 5/2018 | Tsou ................... H04L 51/12 |
| 2018/0253866 | A1* | 9/2018 | Jain .................... G06N 3/0454 |
| 2018/0276864 | A1* | 9/2018 | Hayashi ................ G06T 11/00 |
| 2018/0285696 | A1 | 10/2018 | Eigen et al. |
| 2018/0307942 | A1 | 10/2018 | Pereira et al. |
| 2018/0349527 | A1 | 12/2018 | Li et al. |
| 2018/0349735 | A1 | 12/2018 | Lin et al. |
| 2019/0156202 | A1 | 5/2019 | Falk et al. |
| 2019/0163804 | A1* | 5/2019 | Linton ................. G06F 16/285 |
| 2019/0208412 | A1* | 7/2019 | Lord ................... G06F 16/435 |
| 2019/0245754 | A1* | 8/2019 | Greene, Jr. ............ G06N 3/084 |
| 2019/0257767 | A1 | 8/2019 | Shaubi et al. |
| 2019/0297042 | A1* | 9/2019 | Prabhu ................ G06F 3/04817 |
| 2019/0325183 | A1 | 10/2019 | Tscherepanow et al. |
| 2019/0356956 | A1* | 11/2019 | Sheng ................ G06Q 30/0271 |
| 2020/0005046 | A1* | 1/2020 | Attorre ................ G06T 7/0002 |
| 2020/0092607 | A1* | 3/2020 | Rechner ................ G06F 40/30 |
| 2020/0097724 | A1 | 3/2020 | Chakravarty et al. |
| 2020/0099783 | A1* | 3/2020 | Liu ................... H04M 3/42153 |
| 2020/0125639 | A1* | 4/2020 | Doyle ................. G06F 40/205 |
| 2020/0125928 | A1* | 4/2020 | Doyle ................. G06F 40/30 |
| 2020/0126533 | A1* | 4/2020 | Doyle ................. G10L 15/1815 |
| 2020/0154078 | A1* | 5/2020 | Ahn .................... H04N 7/147 |
| 2020/0160612 | A1 | 5/2020 | Bowen |
| 2020/0162412 | A1* | 5/2020 | Mei ................... G06N 3/084 |

FOREIGN PATENT DOCUMENTS

| | | |
|---|---|---|
| WO | 2017020515 | 2/2017 |
| WO | 2017214970 | 12/2017 |

OTHER PUBLICATIONS

Simonyan et al., "Very Deep Convolutional Networks for Large-Scale Image Recognition," Proceedings of ICLR, 2015, arXiv:1409.1556v6 [cs.CV], https://arxiv.org/pdf/1409.1556.pdf, 2015.

Mu et al., "Fast and Exact Nearest Neighbor Search in Hamming Space on Full-Text Search Engines," Proceedings of SISAP, 2019, arXiv:1902.08498v2 [cs.IR], https://arxiv.org/abs/1902.08498, 2019.

Neurohive, "VGG16—Convolutional Network for Classification and Detection," https://neurohive.io/en/popular-networks/vgg16/, accessed Apr. 27, 2020.

Van Durme et al., "Online Generation of Locality Sensitive Hash Signatures," http://www.cs.jhu.edu/~vandurme/papers/VanDurmeLal-1ACL10-slides.pdf, accessed Apr. 27, 2020.

* cited by examiner

700

710 – Receiving an image at a first-level analysis component comprising a first neural network structure 720 – Analyzing, using the first neural network structure of the first-level analysis component, the image to determine an image category associated the image 730 – Selecting at least one second-level analysis component that is associated with the image category to analyze the image 740 – Analyzing, using a second neural network structure associated with the at least one second-level analysis component that was selected, the image to determine whether the image includes non-compliant content 750 – Executing a corrective measure in response to determining that the image includes non-compliant content

FIG. 7

SYSTEMS AND METHODS FOR DETECTING CONTENT IN IMAGES USING NEURAL NETWORK ARCHITECTURES

TECHNICAL FIELD

This disclosure relates generally to systems, methods, apparatuses, and techniques for performing computer vision functions associated with detecting and classifying non-compliant content using neural network architectures.

BACKGROUND

Many entities provide electronic platforms that store large collections of images in connection with providing products and/or services to customers. These entities often desire to remove, or restrict access to, images including content that is not compliant with policies set forth by the entities. Many entities provide electronic platforms that store large collections of images in connection with providing products and/or services to customers. These entities often desire to remove, or restrict access to, images including content that is not compliant with policies set forth by the entities. For example, it may be desired to remove or restrict access to images that include various types of non-compliant content, such as nudity, sexually explicit content, racist content, racially inappropriate content, and weapons.

A variety of technical obstacles make it difficult to remove images that include non-compliant content. One technical problem relates to accurately identifying images that include the non-compliant content. While this task can be performed manually for small collections of images, manually reviewing large collections of images is often not possible. Although advances in computer vision applications have made significant improvements in understanding image content, existing computer vision applications are not capable of efficiently analyzing very large collections of images (e.g., in the thousands, millions, or hundreds of millions) due to time and processing constraints.

Another technical hurdle relates to detecting non-compliant content in scenarios where the categories of non-compliant content can vary greatly, and each category of non-compliant content can include large intra-class variations. In these scenarios, existing computer vision applications often fail to accurately identify all relevant images. This problem can be attributed, at least in part, to the lack of training data available for most categories and the difficulties associated with training a single classifier across multiple categories in scenarios where there is great diversity in the images.

BRIEF DESCRIPTION OF THE DRAWINGS

To facilitate further description of the embodiments, the following drawings are provided in which:

FIG. 7 is a flowchart for a method, according to certain embodiments.

Figure 1:
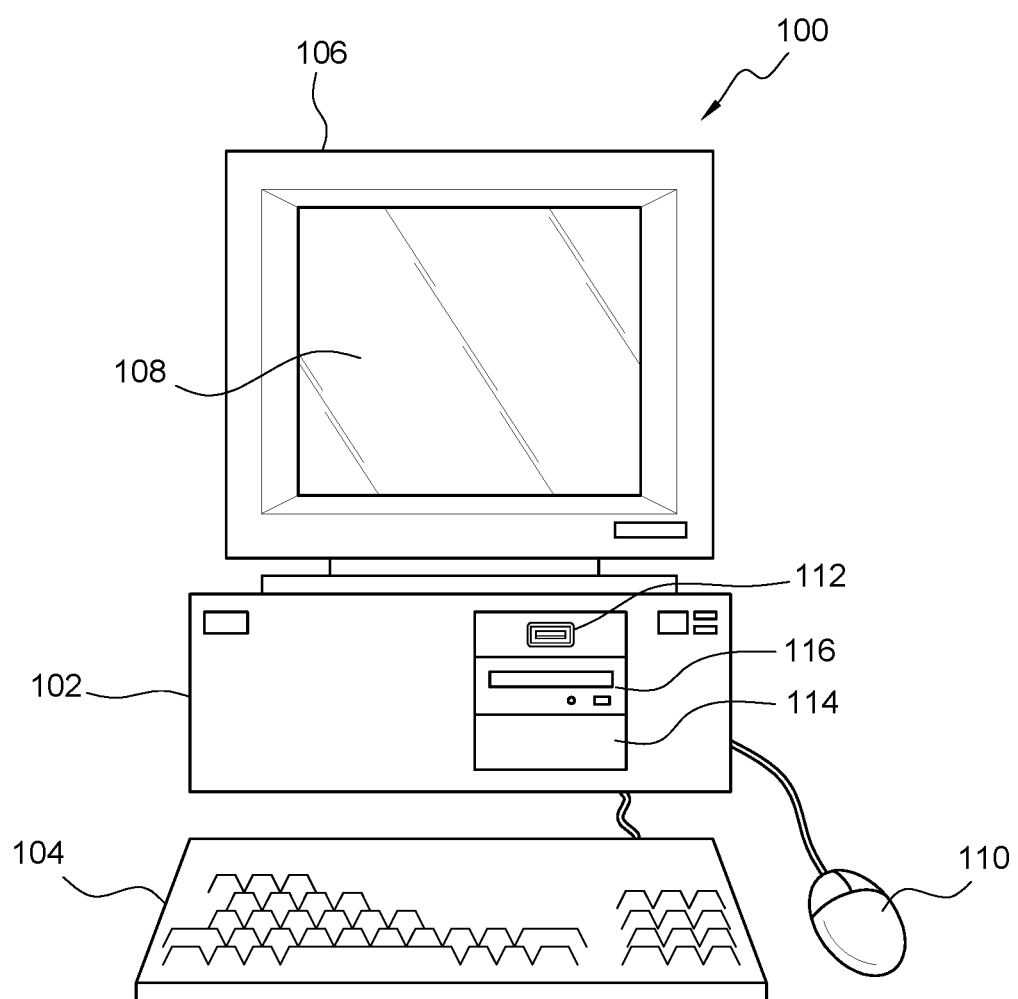
FIG. 1 illustrates a front elevational view of a computer system that is suitable for implementing various embodiments of the systems and methods disclosed in FIGS. 3-7.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of: receiving an image at a first-level analysis component comprising a first neural network structure; analyzing, using the first neural network structure of the first-level analysis component, the image to determine an image category associated with the image; selecting at least one second-level analysis component that is associated with the image category to analyze the image; analyzing, using a second neural network structure associated with the at least one second-level analysis component that was selected, the image to determine whether the image includes non-compliant content; and in response to determining that the image includes non-compliant content, executing a corrective measure.

Various embodiments include a method. The method can include: receiving an image at a first-level analysis component comprising a first neural network structure; analyzing, using the first neural network structure of the first-level analysis component, the image to determine an image category associated with the image; selecting at least one second-level analysis component that is associated with the image category to analyze the image; analyzing, using a second neural network structure associated with the at least one second-level analysis component that was selected, the image to determine whether the image includes non-compliant content; and in response to determining that the image includes non-compliant content, executing a corrective measure.

Various embodiments include a computer program product. The computer program product comprises a non-transitory computer-readable medium including instructions for causing a computer to: receive an image at a first-level analysis component comprising a first neural network structure; analyze, using the first neural network structure of the first-level analysis component, the image to determine an image category associated with the image; select at least one second-level analysis component that is associated with the image category to analyze the image; analyze, using a second neural network structure associated with the at least one second-level analysis component that was selected, the image to determine whether the image includes non-compliant content; and in response to determining that the image includes non-compliant content, execute a corrective measure.

Figure 2:
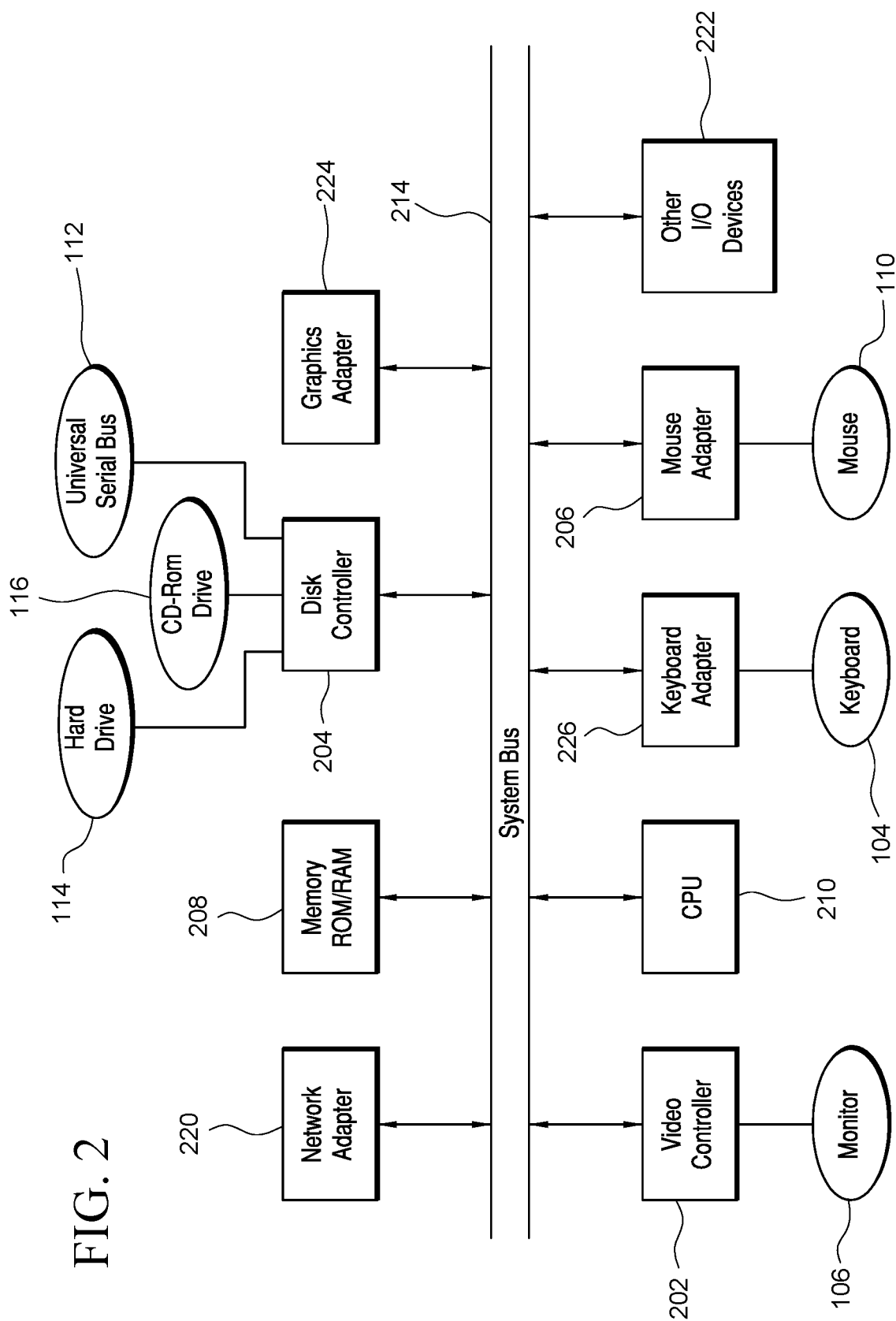
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile electronic device, such as a smartphone. In certain additional embodiments, computer system 100 can comprise an embedded system.

Figure 3:
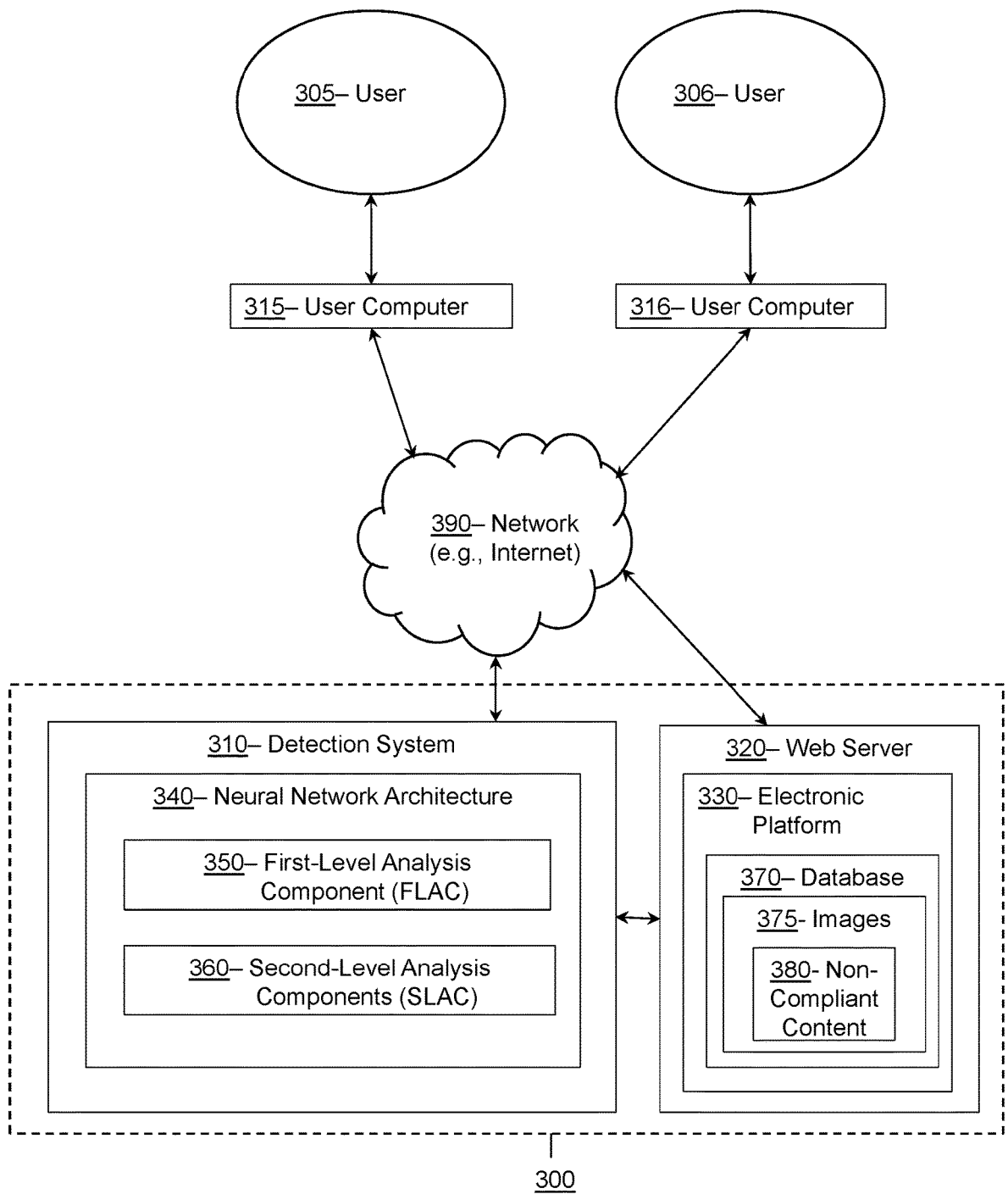
FIG. 3 illustrates a representative block diagram of a system, according to an embodiment.

Turning ahead in the drawings, FIG. 3 illustrates a block diagram of a system 300 that can be employed detecting and/or removing images that include non-compliant content (e.g., non-compliant images), as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a detection system 310, web server 320, electronic platform 330, neural network architecture 340, first-level analysis component 350, and a plurality of second-level analysis components 360. Detection system 310, web server 320, electronic platform 330, neural network architecture 340, first-level analysis component 350, and second-level analysis components 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of detection system 310, web server 320, electronic platform 330, neural network architecture 340, first-level analysis component 350, and second-level analysis components 360. Additional details regarding detection system 310, web server 320, electronic platform 330, neural network architecture 340, first-level analysis component 350, and second-level analysis components 360 are described herein.

In many embodiments, system 300 also can comprise user computers 315, 316. User computers 315, 316 can comprise any of the elements described in relation to computer system 100. In some embodiments, user computers 315, 316 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through a network 390 (e.g., such as the Internet) with user computers (e.g., 315, 316). The network 390 can represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks. In certain embodiments, user computers 315-316 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, detection system 310, web server 320, electronic platform 330, neural network architecture 340, first-level analysis component 350, and second-level analysis components 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of the detection system 310, web server 320, electronic platform 330, neural network architecture 340, first-level analysis component 350, and second-level analysis components 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of detection system 310, web server 320, electronic platform 330, neural network architecture 340, first-level analysis component 350, and second-level analysis components 360. In a similar manner, the processing module(s) and the memory storage module(s) can be local and/or remote to each other.

In many embodiments, detection system 310, web server 320, electronic platform 330, neural network architecture 340, first-level analysis component 350, and second-level analysis components 360 can be configured to communicate with one or more user computers 315 and 316. In some embodiments, user computers 315 and 316 also can be referred to as customer computers. In some embodiments, detection system 310, web server 320, electronic platform 330, neural network architecture 340, first-level analysis component 350, and second-level analysis components 360 can communicate or interface (e.g., interact) with one or more customer computers (such as user computers 315 and 316) through a network 390 or internet. Network 390 can be an intranet that is not open to the public. Accordingly, in many embodiments, detection system 310, web server 320, electronic platform 330, neural network architecture 340, first-level analysis component 350, and second-level analysis components 360 (and/or the software used by such systems) can refer to a back end of system 300 operated by an operator and/or administrator of system 300, and user computers 315 and 316 (and/or the software used by such systems) can refer to a front end of system 300 used by one or more users 305 and 306, respectively. In some embodiments, users 305 and 306 also can be referred to as customers, in which case, user computers 315 and 316 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, detection system 310, web server 320, electronic platform 330, neural network architecture 340, first-level analysis component 350, and second-level analysis components 360 also can be configured to communicate with one or more databases (e.g., such as database 370). The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication among detection system 310, web server 320, electronic platform 330, neural network architecture 340, first-level analysis component 350, and second-level analysis components 360, and/or the one or more databases 370 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, the electronic platform 330 is configured to provide a website for an online retailer or online shopping site that enables users 305, 306 to browse offerings (e.g., products and/or services), place orders, make purchases, access online accounts, and perform other related activities over the network 390. The electronic platform 330 includes a database 370 that stores information associated with the products and/or services, as well as images 375 corresponding to the products and/or services. When users 305, 306 access the website hosted by the electronic platform 330, the electronic platform 330 can display products and/or services, as well as images 375 associated with the products and/or services.

Detection system 310 can be configured to perform functions associated with detecting images 375 that include non-compliant content 380, as well as executing corrective measures for managing images that include non-compliant content 380. In certain embodiments, the non-compliant content 380 can include content that is determined to be crude, hateful, and/or distasteful. For example, non-compliant content 380 in the images 375 can include nudity, sexually explicit content, racist content, racially inappropriate content, weapons (e.g., assault weapons), toys designed as assault weapons, non-compliant text (e.g., including crude, vulgar, expletive words or phrases), and other types of content. The categories of content determined to be non-compliant can be customized based on determinations made by individuals or entities associated with administering, hosting, and/or providing the electronic platform 330. The types of non-compliant content 380 can vary greatly, and can generally include any content that an individual or entity desires to remove from the electronic platform 330 and/or restrict access to on the electronic platform 330.

The detection system 310 can store and execute various functions for detecting non-compliant content 380 in the images 375. In certain embodiments, the detection system 310 comprises a neural network architecture 340 that is trained to detect the non-compliant content 380 in the images 375. Generally speaking, any type of neural network architecture 340 can be employed to detect non-compliant content 380 in the images 375 and the configuration of the neural network architecture 340 can vary.

In certain embodiments, the neural network architecture 340 can comprise one or more neural networks that are trained to detect non-compliant content 380 in the images 375. The neural networks can be implemented as convolutional neural networks (CNNs) in certain embodiments. Each neural network can be configured to analyze images 375 and to execute deep learning functions and/or machine learning functions on the images 375. Each neural network can include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more detection layers, one or more upsampling layers, one or more normalization layers, etc. The configurations of the neural networks and their corresponding layers enable the neural networks to learn and execute various functions for analyzing, interpreting, and understanding the content of the images 375. The functions learned by the neural networks, or other neural network structures, can include computer vision functions that involve object detection, object classification, and/or image classification. Appropriate loss functions can be tailored to optimize the neural networks during training. The functions learned by the neural network architecture 340 can be utilized to classify the images 375 into one or more object categories and to detect non-compliant content 380 in the images 375.

Many online retailers or online shopping sites store large numbers of images 375 associated with providing products and/or services. The number of images 375 stored on these platforms can be in the thousands or millions and, in some cases, can even exceed 100,000,000. This large number of images 375 can create technical obstacles for detecting non-compliant content 380 in the images 375. One technical obstacle relates to detecting various categories of non-compliant content 380 in each of the images 375, which can be very expensive in terms of both time and computational resources.

For example, consider a scenario in which a database 370 stores more than 100,000,000 images 375, and the goal is to determine whether any of images 375 includes one or more categories of non-compliant content 380 (e.g., such as nudity, sexually explicit content, racist content, racially inappropriate content, weapons, etc.). One potential solution could be to train a neural network that utilizes a single classifier to analyze each of the images 375 and to determine whether each of the images falls into one or more of the categories of non-compliant content 380. However, in practice, training a single classifier across multiple categories is challenging because the accuracy of the classifier suffers as a result of the diversity of the images 375 and the lack of training data available for most categories. In addition, due to the large size of the data collection, the time and processing required to analyze each image across multiple categories of non-compliant content 380 can be very expensive and, in many cases, prohibitive.

To overcome the technical challenges mentioned above, certain embodiments of the neural network architecture 340 can utilize a multi-level configuration that enables detection of non-compliant content 380 in large collections of images 375. The multi-level configuration enables the images 375 that potentially include non-compliant content to be funneled to appropriate object detectors based on a likelihood that the images 375 will include certain types of non-compliant content 380. This funneling technique avoids the processing required to analyze each of images 375 with a plurality of different analysis components to detect the various categories of non-compliant content 380. Rather, each image can be analyzed only by analysis components that are relevant to an image category that is associated with the particular one of images 375, thus reducing the computational and processing requirements imposed on the neural network architecture 340. In addition, by configuring the object detectors to detect separate categories of non-compliant content, the accuracy of the detection system 310 can better account for the widespread diversity and scale of the images, thus improving the recall and accuracy of the system with respect to identifying the images 375 that comprise non-compliant content 380.

For example, in certain embodiments, the multi-level configuration of the neural network architecture 340 can include a first-level analysis component (FLAC) 350 and a plurality of second-level analysis components (SLACs) 360 to detect non-compliant content 380 in the images 375. Generally speaking, one goal of the first-level analysis component 350 can be to capture all images 375 that can potentially include non-compliant content 380. To accomplish this goal, the first-level analysis component 350 can include a first neural network structure (e.g., a CNN) that is configured to analyze the images 375 and to assign one or more image categories to each of the images 375.

An image category can generally represent a high-level classification for the image. For example, exemplary image categories can include a person category, a painting category, a sculpture category, a weapon category, a toy category, etc. Because certain image categories are very unlikely to include non-compliant content 380, images 375 assigned to such categories can be approved (e.g., approved for publication on a website provided by the electronic platform 330) and further analysis of such images 375 is not necessary. However, images 375 that are assigned to categories that could potentially include non-compliant content 380 are provided to one or more of the second-level analysis components 360 for further analysis.

Each of the second-level analysis components 360 can be configured to detect a particular category of non-compliant content 380. For example, each of the second-level analysis components 360 can include a neural network structure (e.g., a CNN) that is configured to detect certain types of objects corresponding to non-compliant content 380 in the images 375. For embodiments in which the non-compliant content 380 relates to various types of non-compliant content that is determined to be inappropriate for display on the electronic platform 330, a separate second-level analysis component 360 can be provided to detect each of the following categories of non-compliant content: nudity, sexually explicit content, racist or racially inappropriate content, and assault weapons. It should be recognized that the second-level analysis components 360 can be trained and configured to detect any type of non-compliant content 380, including content that is not determined to be non-compliant in nature.

After a first one of images 375 is analyzed by the first-level analysis component 350, the first one of images 375 can be provided to one or more of the second-level analysis components 360 to determine whether the first one of images 375 includes particular categories of non-compliant content 380. The second-level analysis components 360 that are selected to analyze the first one of images 375 can be based on the image category assigned to the image by the first-level analysis component 350. For example, an image category assigned to one of images 375 can be associated with one or more of the second-level analysis components 360 based on a likelihood that the image could include particular types of non-compliant content 380. This association avoids the need to have each of the second-level analysis components 360 analyze each of the images 375. Rather, the images 375 are only analyzed by second-level analysis components 360 that have a higher likelihood of detecting non-compliant content 380 in the images 375.

As discussed above, the multi-level configuration of the neural network architecture 340 funnels the images 375 to specific second-level analysis components 360 that have increased likelihoods of detecting non-compliant content 380 in the images 375. The funneling of the images 375 is based on an understanding that certain image categories are only likely to include certain types of non-compliant content 380.

To illustrate by example, a first one of images 375 of a person can be assigned to person category by the first-level analysis component 350. Because an image assigned to person category can potentially include nudity (and not likely to include certain other categories of non-compliant content), the first one of images 375 can be provided to, and analyzed by, a second-level analysis component 360 that is configured to detect nudity without providing the first one of images 375 to the other second-level analysis components 360 (e.g., which can be configured to detect other forms of non-compliant content 380 that are not relevant to an image of a person).

As another example, a first one of images 375 of a hunting rifle can be assigned to a weapons category by the first-level analysis component 350. Because the first one of images 375 is assigned to the weapons category, it can be analyzed by a second-level analysis component 360 that is configured to detect non-compliant weapons (e.g., such as assault rifles) without being analyzed by the other second-level analysis components 360 that detect nudity, racist content, and/or other categories of non-compliant content.

The configurations of the first-level analysis component 350 and the second-level analysis components 360 can vary. As mentioned above, the first-level analysis component 350 and the second-level analysis components 360 can be implemented using neural network structures that are configured to perform functions related to detecting objects and/or classifying images and objects. Exemplary configurations of the first-level analysis component 350 and the second-level analysis components 360 are discussed below with reference to FIGS. 4-6.

In response to detecting non-compliant content 380 in a first one of images 375, the detection system 310 can execute one or more corrective actions. In certain embodiments, these corrective actions can include removing or deleting the first one of images 375 with non-compliant content 380 from a database (e.g., such as database 370) and/or the electronic platform 330. The corrective actions can additionally, or alternatively, include preventing the first one of images 375 from being accessible on the electronic platform 330, flagging the first one of images 375 for human review, and/or editing the first one of images 375 (e.g., to remove the non-compliant content 380 or to block the non-compliant content 380) and allowing the edited version of the first one of images 375 to be accessible to the electronic platform 325.

As evidenced by the disclosure herein, the techniques set forth in this disclosure are rooted in computer technologies that overcome existing problems in known computer vision systems, specifically problems dealing with performing classification and object detection functions on large datasets of images 375. The techniques described in this disclosure provide a technical solution (e.g., one that utilizes various AI-based neural networking and machine learning techniques) for overcoming these obstacles. For example, the image analysis techniques described herein take advantage of artificial intelligence and machine learning techniques to learn functions for classifying images and detecting non-compliant content 380 in the images 375. Moreover, in certain embodiments, these functions can be executed using a multi-level neural architecture that is able to process large datasets by funneling images 375 to relevant object detectors that have higher likelihoods of detecting non-compliant content 380 in the images 375. This technology-based solution marks an improvement over existing capabilities and functionalities related to computer vision systems by improving the accuracy of the computer vision functions and reducing the time and processing required to perform such functions.

Figure 4:
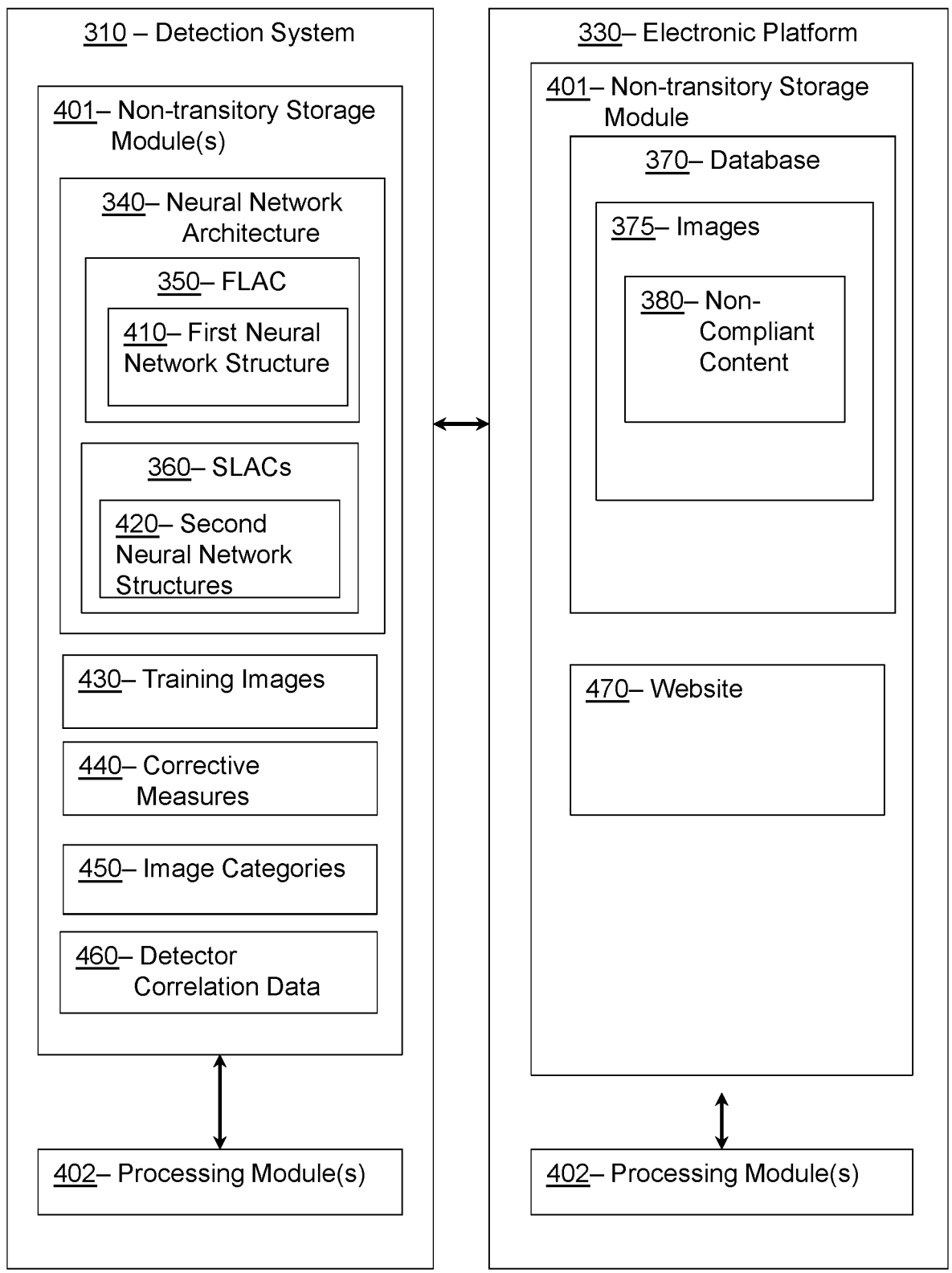
FIG. 4 illustrates a representative block diagram of a portion of the system of FIG. 3, according to an embodiment.

FIG. 4 illustrates a block diagram of a portion of system 300 comprising a detection system 310 and an electronic platform 330, according to the embodiment shown in FIG. 3. Each of the detection system 310 and the electronic platform 330 is merely exemplary and not limited to the embodiments presented herein. Each of the detection system 310 and the electronic platform 330 can be employed in many different embodiments or examples not specifically depicted or described herein. In some embodiments, certain elements or modules of the detection system 310 and the electronic platform 330 can perform various procedures, processes, and/or acts. In other embodiments, the procedures, processes, and/or acts can be performed by other suitable elements or modules. In many embodiments, the detection system 310 and the electronic platform 330 can each comprise one or more non-transitory memory storage modules 401. In many embodiments, the detection system 310 and the electronic platform 330 can each store computing instructions configured to run on one or more processing modules 402 and to perform the functions discussed herein.

Generally, therefore, the system can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system described herein.

In certain embodiments, the first-level analysis component 350 can include a first neural network structure 410 that includes a classifier and/or object detector assigning image categories 450 to the images 375. The first neural network structure 410 can assign one or more of image categories 450 to an image by analyzing various aspects of the first one of images 375. For example, the first neural network structure 410 can assign one or more image categories 450 to a first one of images 375 by analyzing the first one of images 375, objects in the first one of images 375, text included in the first one of images 375, descriptions of the first one of images 375, and/or any other information associated with the first one of images 375.

In certain embodiments, the first-level analysis component 350 can be optimized for high recall even if the precision is not very high. Doing so can be beneficial because, in many cases, it is important to ensure all images 375 that include non-compliant content 380 are detected. For example, a provider of the electronic platform 330 can desire to ensure that all images including objects corresponding to people are detected in order to ensure that the images 375 accessible through the electronic platform 330 do not include nudity. In this scenario, it can be acceptable for the first-level analysis component 350 to detect a few false positives (e.g., which incorrectly assign a first one of images 375 to a person category) so long as all images 375 with person objects are classified in the person category and analyzed for nudity. The same applies to other categories of non-compliant content 380.

It should be recognized that the type and configuration of the first neural network structure 410 can vary greatly. In certain embodiments, the first neural network structure 410 can include a neural network that is pre-trained on an image database (e.g., the ImageNet database and/or other appropriate databases). For example, the first neural network structure 410 can represent a neural network such as ResNet (e.g., ResNet50), AlexNet, VGG, Microsoft Vision, and/or other types of pre-trained neural networks that are configured to perform image classification functions. The layers of such pre-trained networks can be adapted and/or retrained to identify appropriate image categories 450 for providing a high-level classification of the images 375. Regardless of the particular configuration that is utilized, the first neural network structure 410 can be trained to learn the image classification functions using a set of training images 430.

Figure 5:
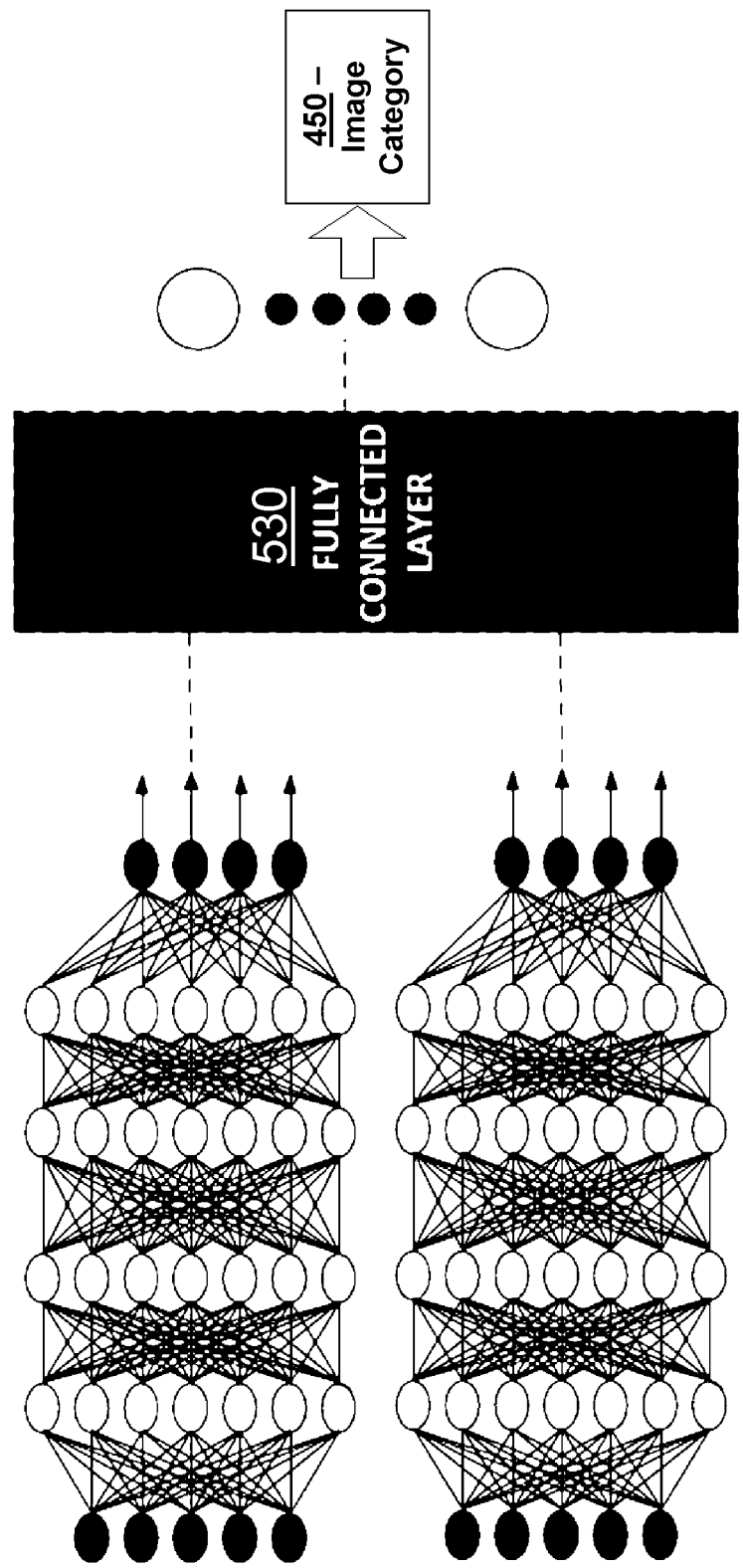
FIG. 5 illustrates a diagram of an exemplary first-level analysis component, according to an embodiment.

FIG. 5 is a block diagram illustrating an exemplary configuration for a neural network 500 that can be utilized by the first-level analysis component to determine and assign image categories to the images. The neural network 500 can be included in the first neural network structure 410 (FIG. 4) of the first-level analysis component 350 (FIGS. 3 and 4). The neural network 500 can include an image classifier 510 and a text classifier 520 that jointly determine the image categories 450 assigned to the images.

The image classifier 510 can be configured to analyze the visual content of the images (e.g., the objects in the images) to assist with classifying the images into one or more object categories. The image classifier 510 can utilize any pixel-level, object-level and/or image-level analysis technique to assist with classifying the images. The text classifier 520 can be configured to analyze text included in the images and/or descriptions of the images to assist with classifying the images into the one or more image categories 450.

The image classifier 510 and the text classifier 520 are each comprised of a plurality of nodes (also referred to as "artificial neurons"). The nodes can be associated with various layers (e.g., convolution layers) to perform processing and transformation functions associated with classifying images into one or more image categories 450. The layers of the image classifier 510 and the text classifier 520 are linked to a fully connected layer 530. The fully connected layer 530 utilizes inputs from the image classifier 510 and the text classifier 520 to jointly determine and/or select one or more image categories 450 to be assigned to each of the images.

Returning back to FIG. 4, the first neural network structure 410 can generally be trained and configured to assign images 375 to any of image categories 450. The image categories 450 can be specified by an individual or administrator associated with the electronic platform 330. In certain embodiments, at least a portion of the image categories 450 can correspond to products and/or services offered by the electronic platform 330, and/or content of images associated with providing such products and/or services on the electronic platform 330. In certain embodiments, exemplary object categories can correspond to persons/individuals, paintings, sculptures, weapons, toys, etc.

The neural network architecture 340 can further include a plurality of second-level analysis components 360. Each of the second-level analysis components 360 can include a second neural network structure 420 that is configured to detect a particular category of non-compliant content 380. For example, in scenarios where the non-compliant content 380 includes separate categories of non-compliant content 380 that is determined to be non-compliant (e.g., nudity, racially inappropriate content, etc.), the second neural network structures 420 can each be configured to detect a particular category of non-compliant content.

Each of the second neural network structures 420 can include one or more object detectors and/or classifiers that are trained to detect objects corresponding to non-compliant content 380 in the images 375. Generally speaking, any type of object detector or classifier can be utilized to implement the object detection functions of the second neural network structures 420. In certain embodiments, similar to the first neural network structure 410, the second neural network structures 420 can include neural networks that are pre-trained on an image database (e.g., the ImageNet database and/or other appropriate databases). For example, the second neural network structures 420 can represent neural network structures such as ResNet (e.g., ResNet50), AlexNet, YOLO ("You-Only-Look-Once"), Microsoft Vision, SSD (single-shot detector), and/or other types of pre-trained neural networks that are capable of performing object detection functions. The layers of such pre-trained networks can be adapted and/or retrained to identify appropriate objects corresponding to non-compliant content 380. Regardless of the particular configuration that is utilized, the second neural network structures 420 can be trained to learn the object detection functions using a set of training images 430.

Figure 6:
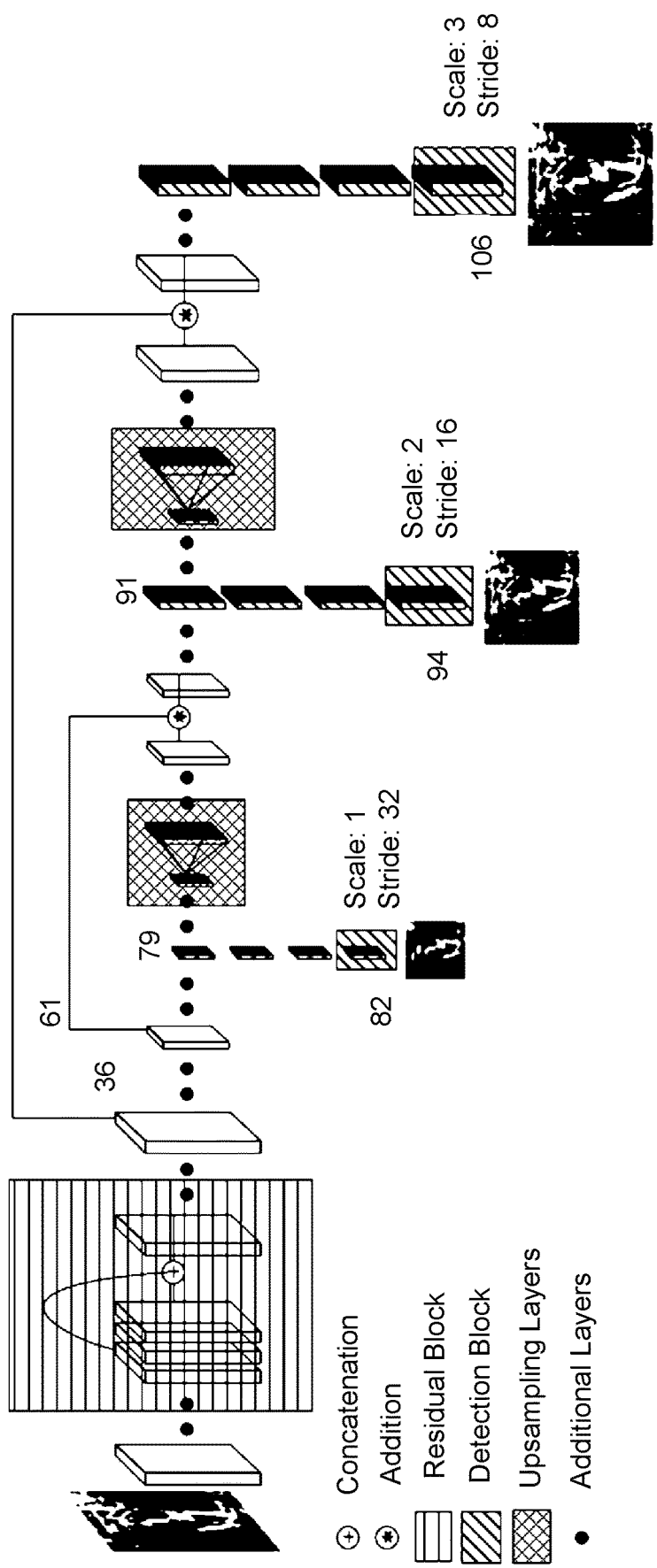
FIG. 6 illustrates a diagram of an exemplary second-level analysis component, according to an embodiment.

FIG. 6 illustrates a diagram of a neural network 600 that can be utilized to implement a second neural network structure 420 of a second-level analysis component 360 according to certain embodiments. The neural network 600 in this figure can be separately trained to identify each of a plurality of separate categories of non-compliant content.

The exemplary neural network 600 in FIG. 6 is based on a YOLO version 3 configuration. This exemplary neural network 600 can be particularly advantageous for handling large collections of images because of its ability to accurately perform object detection at very high speeds. The exemplary neural network 600 includes a plurality of layers including residual layers, detection layers, upsampling layers, and other layers for detecting objects in images that correspond to non-compliant content. For example, upon analyzing an image, the neural network 600 can output confidence scores indicating the presence or absence of such objects in the images, bounding boxes or other data indicating locations of the objects in the images, and data that indicates labels identifying the objects.

Returning back to FIG. 4, in certain embodiments, one or more of the second-level analysis components 360 can utilize multiple object detectors and/or classifiers to determine whether a first one of images 375 includes non-compliant content 380. For example, in response to receiving a first one of images 375, a second-level analysis component 360 can analyze the first one of images 375 using a plurality of separate neural network structures, each of which is configured to detect non-compliant content 380 utilizing a different technique. Each of the object detectors and/or classifiers associated with the second-level analysis component 360 can generate a separate score for the first one of images 375 indicating whether or not the first one of images 375 includes non-compliant content 380. This process can involve querying each of the object detectors and/or classifiers using an application programming interface (API). The second-level analysis component 360 can then select one of the scores, or combine the scores in some manner, to determine whether or not the first one of images 375 includes non-compliant content 380. This technique for identifying non-compliant content 380 can be beneficial because certain detectors or classifiers can be better suited to detect non-compliant content 380 in specific types of images 375.

The detection system 310 can store instructions for executing one or more corrective measures 440 to handle images 375 that include non-compliant content 380. The corrective measures 440 can include functions for preventing the images 375 from being published on the electronic platform 330 and/or limiting access to the images 375. For example, in response to detecting non-compliant content 380 in a first one of images 375, the detection system 310 can execute one or more of the following corrective actions: removing or deleting the first one of images 375; preventing the first one of images 375 from being accessible on the electronic platform 330; flagging the first one of images 375 for human review; editing the first one of images 375 to remove the non-compliant content 380; annotating the first one of images 375 to block the non-compliant content 380; and/or associating the first one of images 375 with a warning message that warns users 305, 306 of the non-compliant content 380. The detection system 310 can execute other types of corrective measures 440 for handling images 375 determined to include non-compliant content 380. For example, the other types of corrective measures 440 can include editing or revising the first one of images 375 to obscure, cover up, or remove the non-compliant content 380 from the first one of images 375, and permit the edited or revised first one of images 375 to be accessed by the electronic platform 330.

The detection system 310 stores detector correlation data 460 that can be used to determine which, if any, of the second-level analysis components 360 receive and analyze the images 375. The detector correlation data 460 can include data that associates the image categories 450 assigned to the images 375 with one or more of the second-level analysis components 360 in order to funnel the images 375 to appropriate detectors. For example, the detector correlation data 460 can indicate that image categories 450 associated with persons, sculptures, and paintings should be analyzed by a second-level analysis component 360 that includes a second neural network structure 420 for detecting nudity. Likewise, the detector correlation data 460 can indicate that images categories 450 associated with toys and hunting weapons should be analyzed by a second-level analysis component 360 that includes a second neural network structure 420 for detecting assault weapons. As explained above, these associations between the image categories 450 and the second-level analysis components 360 can be based on likelihoods that images 375 included in such categories are more likely to include certain types of non-compliant content 380 in comparison to other types of non-compliant content 380. Certain image categories are unlikely to include any category of non-compliant data 380, and therefore, the detector correlation data 460 can indicate that images 375 assigned to such categories do not need to be analyzed by any of the second-level analysis components 360.

In certain embodiments, the detector correlation data 460 can associate a particular image category of image categories 450 with more than one second-level analysis component 360. For example, an image category of image categories 450 associated with persons/individuals can be associated with both a second-level analysis component 360 for detecting nudity and a second-level analysis component 360 for detecting racially inappropriate content. Likewise, in certain embodiments, a first one of images 375 can be associated with more than one image category of image categories 450, each of which is associated with one or more second-level analysis component 360. For example, a first one of images 375 that includes a person holding a gun can be associated with image categories for both persons and weapons. The first one of images 375 can then be analyzed by second-level analysis components 360 for detecting nudity, assault weapons, and/or other categories of non-compliant content 380 that are associated with the image categories 450 assigned to the first one of images 375.

One of the technical obstacles for configuring the detection system 310 to accurately identify images 375 with non-compliant content 380 relates to building an appropriate dataset of training images 430 and applying appropriate training procedures for teaching the neural network structures. The discussion herein details exemplary techniques for generating an appropriate set of training images 430 and utilizing the training images 430 to train the neural network architecture 340. In certain embodiments, the techniques can be applied to train the second-level analysis components 360 to detect non-compliant content 380 in the images 375.

In certain embodiments, the dataset of training images 430 can be constructed using a combination of visual searching techniques and data augmentation techniques. With respect to the visual searching techniques, a visual search engine can receive an image as an input and execute a search aimed at identifying one or more additional images that are similar to the input image. This visual search can be performed on images across a network (e.g., the Internet) and/or on databases comprising collections of images. The visual search engine can include an algorithm that recognizes patterns in the input image and utilizes the patterns to identify the one or more similar images. Applying this technique, an individual can manually select a relatively small collection of relevant images for training the neural network architecture 340, and the visual search engine can identify a large collection of related images to be included in the training images 430.

Data augmentation techniques can also be applied to supplement the training images 430 and to assist the neural network architecture 340 with identifying variations in non-compliant content 380. In certain embodiments, the data augmentation techniques utilize a selected set of the training images 430 to generate new training images 430 by applying various transformations on the selected set of the training images 430. The types of transformations performed on the training images 430 can include one or more of: adjusting translations of the training images 430 or objects included in the training images 430; flipping or inverting the training images 430 or objects included in the training images 430; rotating the training images 430 or objects included in the training images 430; adjusting the contrast of the training images 430 or objects included in the training images 430; adjusting colors in the training images 430 or objects included in the training images 430; and/or adding noise to the training images 430 or objects included in the training images 430. Other types of transformations also can be applied. Applying any of the aforementioned transformations, or other types of transformations, can be utilized to multiply the number of the training images 430.

Each of the training images 430 can be annotated with bounding boxes (e.g., that provided boxes in the images identifying the locations of objects) and/or anchor boxes (e.g., that include boxes with predetermined height-width ratios to identify the locations of objects in the images). In certain embodiments, the use of anchor boxes in the training images 430 can assist with training the neural network architecture to identify multiple objects in a single image.

Once an appropriate set of training images 430 is compiled using the above techniques and/or other techniques, the training images 430 can be utilized to train the second neural network structures 420 of the neural network architecture 340. Any appropriate training technique can be applied.

As explained above, the second neural network structures 420 can include pre-trained neural networks (e.g., ResNet50, YOLO v3, and/or other pre-trained networks). In certain embodiments, a two-step training procedure can be applied to retrain these neural networks to detect non-compliant content 380. In a first training step, certain layers of the pre-trained networks can be unfrozen and the neural network can be trained using the training images 430. For example, in embodiments in which YOLO v3 is utilized, the last three layers can be unfrozen and the neural network can be trained using the training images 430. In this training step, the pre-trained weights of the neural network will be adjusted slightly to account for the specific categories of non-compliant content 380 included in the training images 430. Once the pre-trained weights have been modified, a second training step can be applied which involves unfreezing all of the layers in the neural network and retraining the entire neural network using the training images 430. This two-step technique can generate a better model for detecting non-compliant content.

In certain embodiments, the aforementioned training techniques also can be utilized to train the first neural network structure 410 of the first-level analysis component 350 to assign appropriate image categories 450 to the images 375. For example, after an appropriate set of training images 430 is compiled corresponding to the various image categories, certain layers of a pre-trained neural network can be unfrozen and retrained using the above two-step training procedure and/or other training procedures.

In certain embodiments, multiple processing modules 402 can be employed to reduce the time required to train the neural network architecture 340 and corresponding neural network structures. The processing modules 402 utilized to train the neural network architecture 340 can include a plurality of graphics processing units (GPUs). In certain embodiments, the distributed processing techniques can be implemented using the multi_gpu_model function included in the Keras library. Other implementations also can be used.

In certain embodiments, the techniques discussed herein for detecting non-compliant content 380 in images 375 and/or executing corrective measures 440 to handle images with non-compliant content 380 can be executed to control the display of images 375 on a website 470 that is provided by the electronic platform 330. The website 470 can represent an online shopping site and/or a website that is provided in connection with an online retailer. The techniques for detecting non-compliant content 380 in images 375 and/or executing corrective measures 440 can be performed as a pre-processing step (e.g., before such images 375 become publically accessible on the website 470) and/or can be performed in real time as images 375 are provided to the electronic platform 330 (e.g., as images 375 are uploaded to the electronic platform 330 by sellers, third parties, and/or website administrators). Executing these techniques can be beneficial because displaying the images 375 with non-compliant content 380 can have negative impacts on businesses due to offending customers and/or violating the website's usage policies.

Turning ahead in the drawings, FIG. 7 illustrates a flow chart for a method 700, according to an embodiment. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of method 700 can be performed in any suitable order. In still other embodiments, one or more of the activities of method 700 can be combined or skipped. In many embodiments, system 300 (FIG. 3) can be suitable to perform method 700 and/or one or more of the activities of method 700. In these or other embodiments, one or more of the activities of method 700 can be implemented as one or more computer instructions configured to run at one or more processing modules 402 (FIG. 4) and configured to be stored at one or more non-transitory memory storage modules 401 (FIG. 4). Such non-transitory memory storage modules 401 (FIG. 4) can be part of a computer system such as system 300, detection system 310 (FIGS. 3 & 4), and/or electronic platform 330 (FIGS. 3 & 4). The processing module(s) also can be similar or identical to the processing module(s) described above with respect to computer system 100 (FIG. 1).

In certain embodiments, method 700 can comprise an activity 710 of receiving an image at a first-level analysis component comprising a first neural network structure. The neural network structure can represent a pre-trained neural network that is configured to perform image classification functions.

In certain embodiments, method 700 also can comprise an activity 720 of analyzing the image, using the first neural network structure of the first-level analysis component, to determine an image category associated the image. The image category can represent a high-level image classification for the image and/or can correspond to various types of products and/or services offered by an electronic platform. The image categories available for assignment to the image can vary greatly. For example, upon analyzing the image, the first neural network structure can assign an image to at least the following exemplary categories: person, vehicle, weapon, toy, food, vehicle, furniture, appliances, paintings, sculptures, electronics, etc.

In certain embodiments, method 700 can comprise an activity 730 of selecting at least one second-level analysis component that is associated with the image category to analyze the image. The at least one second-level analysis component can be selected based on detector correlation data. The detector correlation data can establish a relation between an image category and one or more second-level analysis components that have higher likelihoods of detecting non-compliant content based on the image category.

In certain embodiments, method 700 can comprise an activity 740 of analyzing the image using a second neural network structure associated with the at least one second-level analysis component to determine whether the image includes non-compliant content. In certain embodiments, the non-compliant content can include content that is designated or specified as being non-compliant (e.g., nudity, racially inappropriate content, assault weapons, etc.).

In certain embodiments, method 700 can comprise an activity 750 of executing a corrective measure in response to determining that the image includes non-compliant content. The corrective measure can involve removing or deleting the image, such that it is no longer accessible via the electronic platform. Other types of corrective measures can additionally, or alternatively, be executed, such as flagging the image for human review, editing the image (e.g., to remove or block the non-compliant content, but continue to permit the image to be accessible via the electronic platform), and/or associating the image with a warning message.

In some embodiments, the activities in method 700 can comprise using a distributed network comprising distributed memory architecture to perform the associated activity. This distributed architecture can reduce the impact on the network and system resources to reduce congestion in bottlenecks while still allowing data to be accessible from a central location.

Although systems and methods set forth in this disclosure have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 7 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) or are potentially equivalents of express elements and/or limitations in the claims under the doctrine of equivalents.

What is claimed is:

1. A system comprising:
   one or more processors; and
   one or more non-transitory computer-readable storage media storing computing instructions configured to run on the one or more processors and perform acts of:
   receiving an image at a first-level analysis component comprising a first neural network structure;
   analyzing, using the first neural network structure of the first-level analysis component, the image to determine an image category associated with the image;
   selecting at least one second-level analysis component that is associated with the image category to analyze the image;
   analyzing, using a second neural network structure associated with the at least one second-level analysis component that was selected, the image to determine whether the image includes non-compliant content; and
   in response to determining that the image includes the non-compliant content, executing a corrective measure.

2. The system of claim 1, wherein:
   the first neural network structure of the first-level analysis component comprises a first neural network that is trained to determine the image category of the image.

3. The system of claim 2, wherein:
   the second neural network structure associated with the at least one second-level analysis component comprises at least one second neural network that is trained to detect and classify the non-compliant content in the image.

4. The system of claim 1, wherein:
   a plurality of second-level analysis components are available for analyzing the image, wherein the plurality of second-level analysis components comprise the at least one second-level analysis component; and
   each of the plurality of second-level analysis components comprises a corresponding neural network structure that is trained to identify a separate category of non-compliant content.

5. The system of claim 4, wherein:
   the first-level analysis component is configured to select the image category for the image from a plurality of image categories;

each of the plurality of image categories is associated with one or more of the plurality of second-level analysis components; and the at least one second-level analysis component is selected based on associations between the plurality of image categories and the plurality of second-level analysis components.

6. The system of claim 4, wherein:

the plurality of second-level analysis components is capable of detecting whether images include the non-compliant content that is designated as being non-compliant;

the images comprise the image; and the non-compliant content comprises categories pertaining to at least one of:
an assault weapon;
sexually explicit content;
racially inappropriate content; or
nudity.

7. The system of claim 1, wherein executing the corrective measure includes one or more of:
removing the image from a database;
preventing the image from being published on a website;
flagging the image for manual review;
deleting the image;
removing the non-compliant content from the image; or
annotating the image to block the non-compliant content.

8. The system of claim 1, wherein:

the at least one second-level analysis component is selected based on detector correlation data that associates the image category with the at least one second-level analysis component.

9. The system of claim 1, wherein:

the at least one second-level analysis component is trained using a set of training images; and the set of training images is compiled using one or more of: data augmentation techniques or computer vision techniques.

10. The system of claim 1, wherein:

the image is associated with a website provided by an electronic platform; and the first-level analysis component and the at least one second-level analysis component analyze the image to determine whether the image should be published on the website.

11. A method being implemented via execution of computing instructions configured to run at one or more processors and configured to be stored at one or more non-transitory computer-readable mediums, the method comprising:

receiving an image at a first-level analysis component comprising a first neural network structure;

analyzing, using the first neural network structure of the first-level analysis component, the image to determine an image category associated with the image;

selecting at least one second-level analysis component that is associated with the image category to analyze the image;

analyzing, using a second neural network structure associated with the at least one second-level analysis component that was selected, the image to determine whether the image includes non-compliant content; and in response to determining that the image includes the non-compliant content, executing a corrective measure.

12. The method of claim 11, wherein the first neural network structure of the first-level analysis component comprises a first neural network that is trained to determine the image category of the image.

13. The method of claim 12, wherein the second neural network structure associated with the at least one second-level analysis component comprises at least one second neural network that is trained to detect and classify the non-compliant content in the image.

14. The method of claim 11, wherein:

a plurality of second-level analysis components are available for analyzing the image, wherein the plurality of second-level analysis components comprise the at least one second-level analysis component; and each of the plurality of second-level analysis components comprises a corresponding neural network structure that is trained to identify a separate category of non-compliant content.

15. The method of claim 14, wherein:

the first-level analysis component is configured to select the image category for the image from a plurality of image categories;

each of the plurality of image categories is associated with one or more of the plurality of second-level analysis components; and the at least one second-level analysis component is selected based on associations between the plurality of image categories and the plurality of second-level analysis components.

16. The method of claim 14, wherein:

the plurality of second-level analysis components is capable of detecting whether images include the non-compliant content that is designated as being non-compliant;

the images comprise the image; and the non-compliant content comprises categories pertaining to at least one of:
an assault weapon;
sexually explicit content;
racially inappropriate content; or
nudity.

17. The method of claim 11, wherein executing the corrective measure includes one or more of:
removing the image from a database;
preventing the image from being published on a website;
flagging the image for manual review;
deleting the image;
removing the non-compliant content from the image; or
annotating the image to block the non-compliant content.

18. The method of claim 11, wherein:

the at least one second-level analysis component is selected based on detector correlation data that associates the image category with the at least one second-level analysis component.

19. The method of claim 11, wherein:

the at least one second-level analysis component is trained using a set of training images; and the set of training images is compiled using one or more of: data augmentation techniques or computer vision techniques.

20. A computer program product comprising a non-transitory computer-readable medium including instructions for causing a computer to:

receive an image at a first-level analysis component comprising a first neural network structure;

analyze, using the first neural network structure of the first-level analysis component, the image to determine an image category associated with the image;

select at least one second-level analysis component that is associated with the image category to analyze the image;

analyze, using a second neural network structure associated with the at least one second-level analysis component that was selected, the image to determine whether the image includes non-compliant content; and in response to determining that the image includes the non-compliant content, execute a corrective measure.

\* \* \* \* \*